(No Model.)
W. A. MILES.
SCREW JOINT FOR METAL PIPE FITTINGS.
No. 272,574. Patented Feb. 20, 1883.
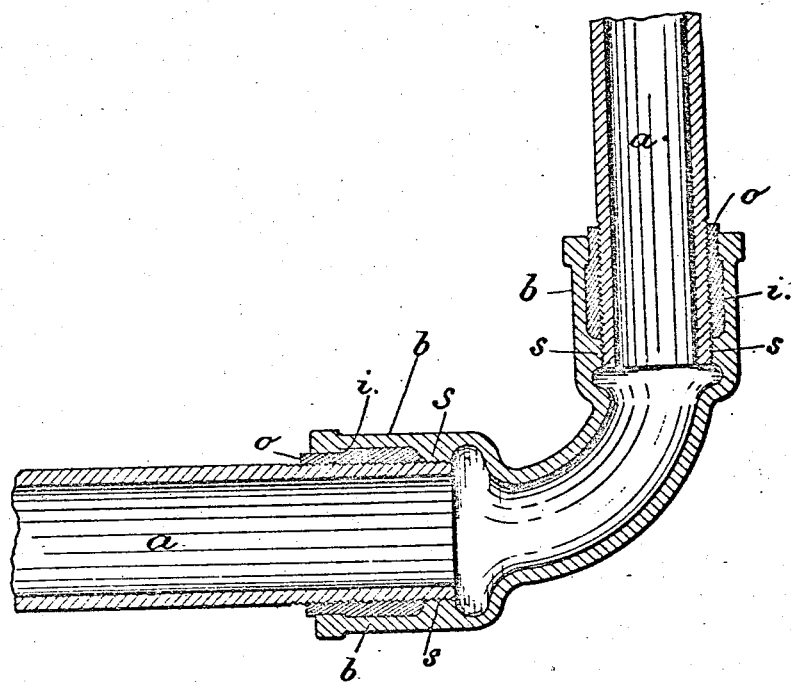

UNITED STATES PATENT OFFICE.

WILLIAM A. MILES, OF COPAKE IRON WORKS, NEW YORK.

SCREW-JOINT FOR METAL-PIPE FITTINGS.

SPECIFICATION forming part of Letters Patent No. 272,574, dated February 20, 1883.

Application filed July 21, 1882. (No model.)

*To all whom it may concern:*

Be it known that I, WILLIAM A. MILES, of Copake Iron Works, in the county of Columbia and State of New York, have invented an Improvement in Screw-Joints for Metal-Pipe Fittings, of which the following is a specification.

In steam, gas, and water fittings it is usual to employ iron pipes with screw-threads cut around the ends, and to enter these into the screw-sockets, T's, bends, unions, cocks, sleeves, or couplings, in which female threads are provided. These sockets, bends, or couplings are usually of malleable cast-iron, and if from a sand-hole or any slight flaw the screw-joint leaks after being placed together there is no means of rendering the same tight, especially with steam-fittings where cement cannot be reliably applied, as with gas-fittings, and leaks of this kind usually increase by the washing action of the steam under pressure, removing the rust that forms from time to time. Iron pipes have been made with lead packing between the respective lengths, and this lead can be calked so as to stop leaks if they arise.

My present invention is for applying to the screw-joints of iron or similar metal tubes a packing of lead or other soft metal that can be calked to render the joint perfectly tight, and at the same time not interfere with the screwing up or the unscrewing of the pipe.

In the drawing, I have represented by a section a reducing bend, with my improvement applied to the screw-joints.

The tubes $a$ are to be of iron, brass, galvanized iron, or other metal, and the portion $b$ is the socket receiving the screw-threaded end of such tube $a$. This screw-socket or female thread may be in the pipe-fittings known as "bends," "T's," "couplings," "unions," "reducers," "cocks," or "sleeves," or in other similar devices. Each socket is provided with a recess, $i$, for the reception of lead or similar soft metal cast around the screw-threaded end of the tube $a$, the lead being exposed at $o$ around the end of the socket, so that the same may be consolidated into the screw-thread by calking such lead by a punch or blunt chisel. It is usually preferable to allow the tube $a$ to screw into the cast-iron of the socket at $s$, so that any tension or compression acting endwise of the pipe $a$ shall not act upon the soft metal in $i$, but be taken upon the hard-metal portion of the socket. In this case the screw-thread will be cut in the portion $s$, and a section of pipe screwed thereinto, after which the lead is cast into such recess $i$ and the section unscrewed. This leaves the socket ready for use, and after the pipes have been screwed together the lead is to be calked in if there is any leak.

By this improvement the use of red lead and white lead is rendered unnecessary, which is a great advantage, especially where water flows through the pipe, as it is not liable to become contaminated with lead-poisons.

I am aware that an annular socket has been made around the pipe and within the coupling or union for the reception of lead; but this has been cast or run in to solder the parts together, and required the application of heat after the pipe and coupling were screwed together. In my improvement the screw-thread is within the lead, so that the pipe is screwed into the lead portion as well as into the iron, and the lead is calked, if necessary, to make it tight.

I claim as my invention—

1. A screw-socket for screw-threaded tubing, having a lead packing in a recess at the outer end of the socket, there being a screw-thread upon the inner surface of the lead to receive the tubing, as set forth.

2. A screw-socket for screw-threaded tubing, having a lead packing in a recess at the outer end of the socket, there being a screw-thread upon the inner surfaces of the iron socket and the lead packing, substantially as specified.

Signed by me this 24th day of June, A. D. 1882.

WILLIAM A. MILES.

Witnesses:
THOMAS B. KEATING,
WILLIAM KNIGHT.